United States Patent
Kim et al.

(10) Patent No.: US 10,123,081 B2
(45) Date of Patent: Nov. 6, 2018

(54) METHOD OF PROVIDING SERVICE FOR RECOMMENDING GAME VIDEO

(71) Applicant: Minkonet Corporation, Seoul (KR)

(72) Inventors: Taewoo Kim, Gwacheon-si (KR); Dong Hwal Lee, Gwangmyeong-si (KR)

(73) Assignee: MINKONET CORPORATION, Seoul (KR)

( * ) Notice: Subject to any disclaimer, the term of this patent is extended or adjusted under 35 U.S.C. 154(b) by 862 days.

(21) Appl. No.: 14/616,433

(22) Filed: Feb. 6, 2015

(65) Prior Publication Data
US 2016/0182956 A1 Jun. 23, 2016

(30) Foreign Application Priority Data
Dec. 18, 2014 (KR) .......................... 10-2014-0183215

(51) Int. Cl.
*A63F 13/45* (2014.01)
*H04N 21/466* (2011.01)
(Continued)

(52) U.S. Cl.
CPC ......... *H04N 21/4668* (2013.01); *A63F 13/35* (2014.09); *A63F 13/533* (2014.09);
(Continued)

(58) Field of Classification Search
CPC ........................................................ A63F 13/45
See application file for complete search history.

(56) References Cited

U.S. PATENT DOCUMENTS

| 6,699,127 B1* | 3/2004 | Lobb ....................... A63F 13/10 345/418 |
| 7,823,056 B1* | 10/2010 | Davey ..................... G11B 27/34 715/202 |
| 2013/0005471 A1* | 1/2013 | Chung ..................... A63F 13/63 463/42 |

FOREIGN PATENT DOCUMENTS

KR     10-2010-0006496     1/2010

* cited by examiner

*Primary Examiner* — Omkar Deodhar
(74) *Attorney, Agent, or Firm* — Ladas & Parry, LLP

(57) ABSTRACT

It is distinguished that, to achieve the purpose above, the game video recommendation service in this invention is provided through the following phases in presenting the service of recommending to a game user another user's' game video: (a) the phase where, based on the object information including 3D shape information of the characters, props and backgrounds constituting game videos, the script information is saved in the video server for form a video list for game play video rendering, which records data on the appearance and disappearance points of time of characters, props and backgrounds included in the above-mentioned object information as well as their movements according to time; (b) the phase where users' in-game failures are detected and sent by the above game device the server; (c) the phase where the video lists saved in the said server are searched and videos (failure videos) including the foresaid failure situations or success videos resolving such situations are extracted; (d) the phase where a message recommending the failure video or success video searched in the previous (c) process (recommendation message) is sent to the game device that has sent the corresponding failure situation; and (e) the phase where the recommendation message of the (d) process is displayed on the device.

7 Claims, 3 Drawing Sheets

(51) Int. Cl.
*H04N 21/488* (2011.01)
*G06F 17/30* (2006.01)
*G06K 9/00* (2006.01)
*H04N 21/81* (2011.01)
*H04N 21/4722* (2011.01)
*A63F 13/35* (2014.01)
*A63F 13/533* (2014.01)
*H04N 21/8543* (2011.01)
*A63F 13/86* (2014.01)
*A63F 13/795* (2014.01)

(52) U.S. Cl.
CPC ............ *A63F 13/795* (2014.09); *A63F 13/86* (2014.09); *G06F 17/3079* (2013.01); *G06K 9/00718* (2013.01); *H04N 21/4722* (2013.01); *H04N 21/4882* (2013.01); *H04N 21/812* (2013.01); *H04N 21/8543* (2013.01); *G06K 2009/00738* (2013.01)

METHOD OF PROVIDING SERVICE FOR RECOMMENDING GAME VIDEO

CROSS-REFERENCE TO RELATED APPLICATION

This application claims the priority and benefit of Korean Patent Application No. 10-2014-0183215, filed on Dec. 18, 2014, with the Korean Intellectual Property Office, the disclosure of which is incorporated in its entirety herein by reference.

BACKGROUND

The invention is on the method of providing services for game video recommendation. More specifically, it is about a method to collect game users' game playing video, save them in a server and recommend to users potentially interested in such a video.

Recently, web users have become able to view and replay videos in diverse areas through video service providing systems such as Youtube. Also, as smart phones, tablet PCs, etc. have become popularized, mobile device-based games have increased beyond those solely for personal computers or exclusive game consoles and their uses have also expanded. Accordingly, more and more users upload their own game play videos on video service sites or watch other players' uploaded videos to enjoy games.

Previously the typical way of generating a game video was to capture real-time images displayed on terminal screen and save them as a video file which is the collection of consecutive image frames. Since such a method imposes much load on the operation equipment of game console, it often interrupted or slowed game play. Some conventional methods intentionally decreased the picture quality of video to lighten the load on the operation equipment of game console for record. If a low-resolution device was used to record a video, such a video, when played with another device, provided poorer picture quality and diminished user interest.

Unless a user additionally keys in the type of game or related specific situation to explain a video saved in the video provision server, viewers cannot recognize the type of game or situation just by watching the video. Such a difficulty also obstructed proactive recommendation service of desired videos to game users.

RELATED ART DOCUMENT

Patent Document (Patent Document 0001) Published Unexamined Patent Application No 10-2010-0006496 (2010 Jan. 19)

SUMMARY

The invention addresses such problems of existing technologies as described above to make a useful game video recommendation to gamers. The invented method could provide videos at a relatively small capacity and aims at recommending game videos with an appropriate resolution level in line with a device to play the game.

It is distinctive that, to achieve the purpose above, the game video recommendation service in this invention is provided through the following phases in presenting the service of recommending to a game user another user's' game video: (a) the phase where, based on the object information including 3D shape information of the characters, props and backgrounds constituting game videos, the script information is saved in the video server for form a video list for game play video rendering, which records data on the appearance and disappearance points of time of characters, props and backgrounds included in the above-mentioned object information as well as their movements according to time; (b) the phase where users' in-game failures are detected and sent by the above game device the server; (c) the phase where the video lists saved in the said server are searched and videos (failure videos) including the foresaid failure situations or success videos resolving such situations are extracted; (d) the phase where a message recommending the failure video or success video searched in the previous (c) process (recommendation message) is sent to the game device that has sent the corresponding failure situation; and (e) the phase where the recommendation message of the (d) process is displayed on the device.

The game video recommendation service provision method in this invention automatically extracts a video possibly interesting to a user according to a specific type of game and recommends the user to watch certain corresponding videos.

In addition, the game video recommendation method herein helps users watch game videos simply via lower-capacity data transmission.

The invented method ensures users easy edition of game videos for replay.

DETAILED DESCRIPTION

Figure 1:
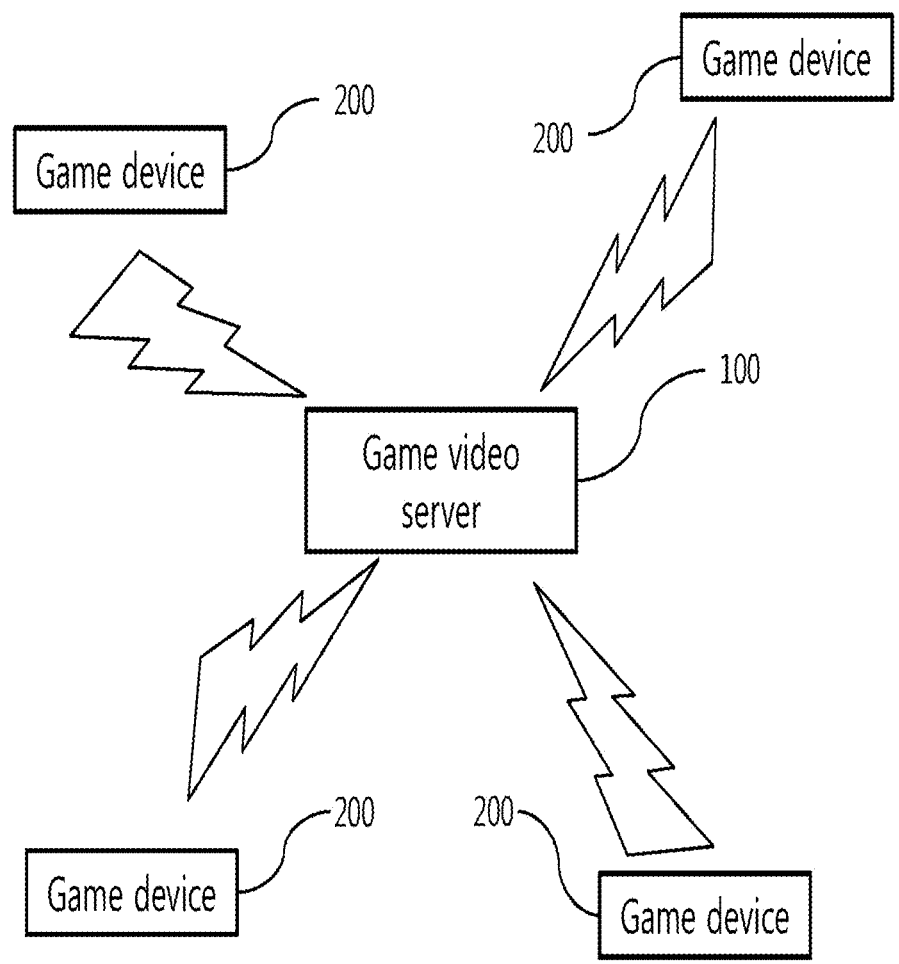
FIG. 1 outlines the relationship between a video server and game devices to implement the methods of providing the game video recommendation service pursuant to this invention according to its implementation case example
Figure 2:
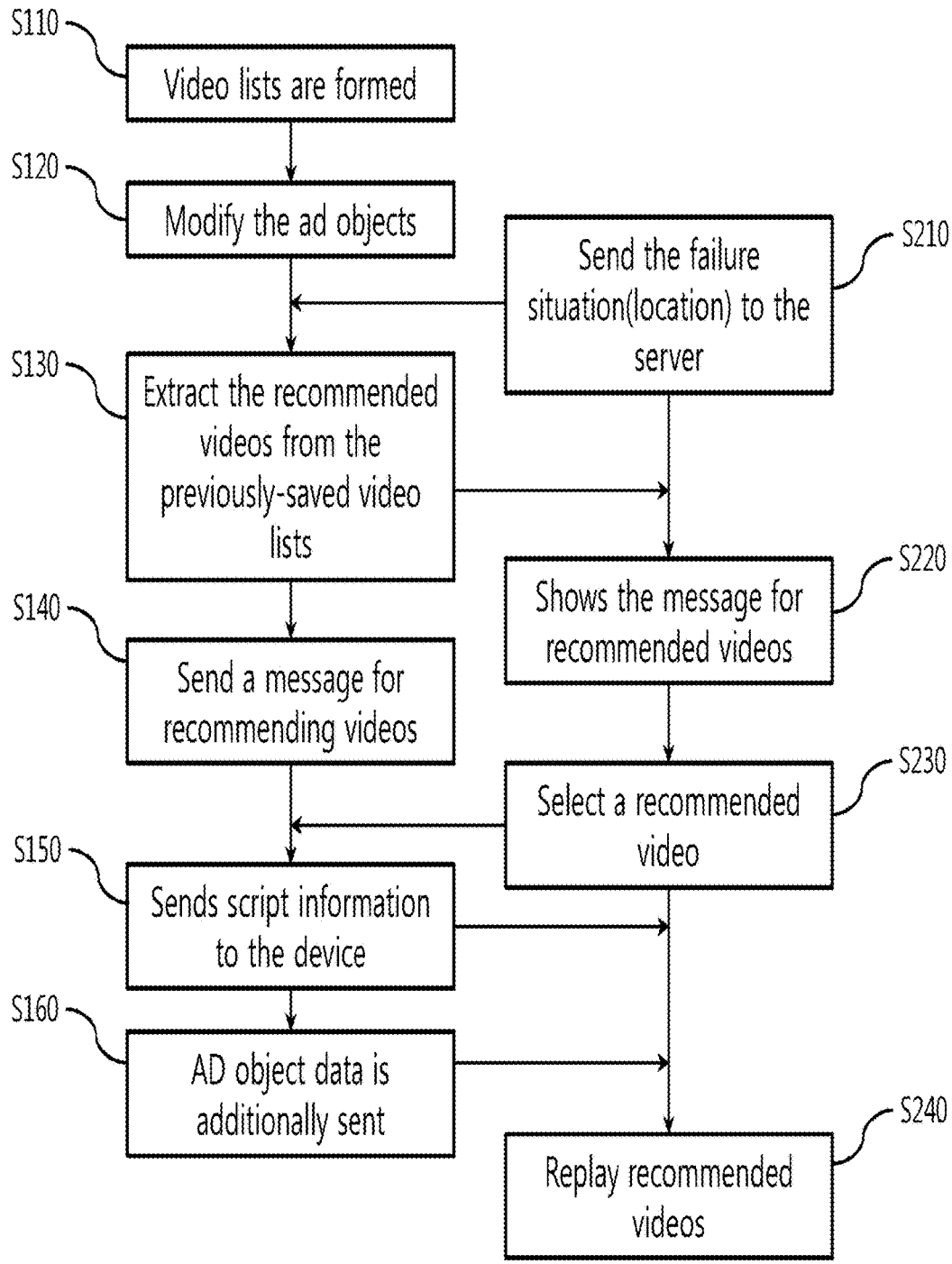
FIG. 2 is a flow chart to explain the method of providing the game video recommendation service of this invention according to its implementation case example.
Figure 3:
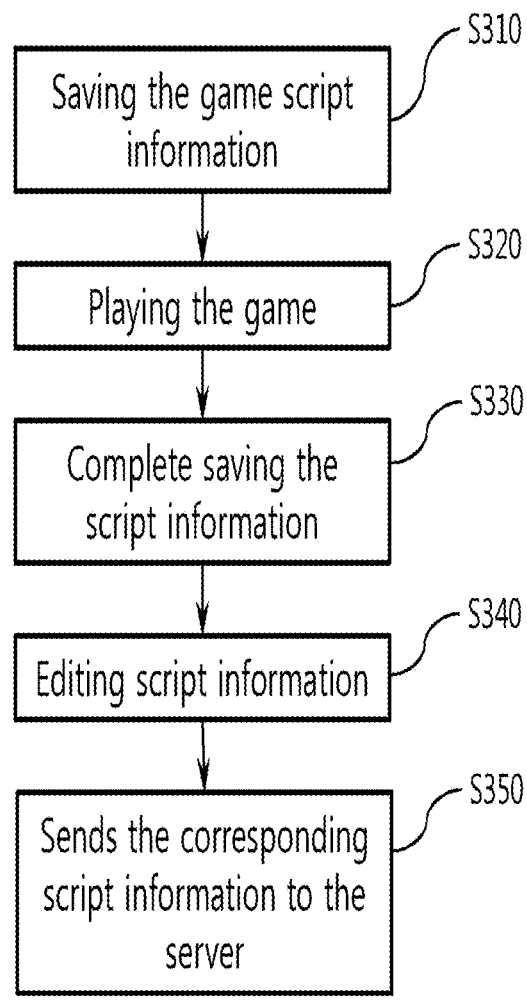
FIG. 3 is a flow chart to explain the process of generating a video in a game device concerning the recommendation service provision method according to its implementation case example.

The method of providing the game video recommendation service in this invention is explained in details, by referring to the attached plans hereunder.

Plan 1 outlines the relationship between the video server and game devices to implement the method of providing the game video recommendation service pursuant to this invention according to its implementation case example and Plan 2 is a flow chart to explain the method of providing the game video recommendation service of this invention according to its implementation case example.

The method of providing the game video recommendation service in this invention takes place between the video server (100) and game device (200) in this implementation example as shown in Plan 1. The server (100) stores game related videos. The device (200) is a tool for a user to play the game. Mobile devices such as mobile phones and tablet PCs or personal computers and others could function as a game device (200). In this example case, the recommendation service targets games operating based on object information and script information. Object information is 3D shape information of characters, props and background constituting a game. Object information is data in the 3D mesh-shaped data and generally provided through a game development tool. If a user installs a game in his or her game device (200), the object information used for the game is automatically saved in the device (200). Script information includes data on the appearance and disappearance points of time of characters, props and backgrounds included in the object information as well as their movements according to time (the idea encompasses object movement, modification, travel, angle changes, etc). Script information refers to numerically-expressed data of changes in objects' (characters, props, backgrounds) positions, angles and movements according to time. Based on this script information, each game object is stopped, assigned or moved.

As such, in the case of games operated by using object information and script information, if necessary object information has been already stored in the device (200), game videos can be replayed only with script information. That is, a user does not need to record all of the game play videos by unit of image frame. Just real time script information needs to be recorded and saved. Then the script information and object information is encoded and rendered to replay the videos.

The process of recommending a video to the device (200) user in the server (100) is explained in details hereunder, by using the object information and script information as mentioned above based on Plan 2.

First, videos of diverse game play situations are saved in the server (100) and a video list is formed (phase (a); S110). The videos saved in the phase (a) are not the kind of videos stored by pressing each image frame but they are in the form of script information encoded together with object information to display a video on screen. Such a video can be saved by server administrators or a device (200) user by sending it to the server (100). More specific cases of video storage in the server (100) will be explained later on. In this invention, since videos are provided in the form of script, object information is not necessarily saved in the server (100) all the time. However, if videos are to be stored in the conventional streaming method other than in the script information form, it is desirable to save object information in the server (100).

As said, when a video list is formed in the server (100), the server (100) recommends videos to the device (200) depending upon a user's game play situations.

If a user fails to solve a specific game task while playing the game with the device (200), the device (200) recognizes the failure situation and sends it to the server (100). (phase (b); S210). Such a failure situation could be a location in the game where the user failed to solve the task or a specific view in the game. Depending upon the cases it could be the death, disappearance or collapse of the characters (object) in the game. As for sports games, a failure situation could be when failing to do a certain play. Failure situations vary according to game types and are easily recognized via script information.

The server (100) uses failure situation information received from the device (200) and extracts videos including failure situations (failure situation videos or videos solving such failure situations (success videos) from the previously-saved video lists (phase (c); S130). When the device (200) sends the numerical information (numbers recognizable as script information) of a certain failure situation, the server (100) bases on the failure situation information and easily searches for a video including the corresponding failure situation or resolving it in the video lists.

As such, once a failure situation video or success video is found, the server (100) sends a message recommending the video (recommendation message) to the device (200) that has sent failure situation information first. (phase (d); S140)

The device (200) shows the recommendation message received in the process (d) on the device (200) display (phase (e); S220) As videos on the point of the user's game task failure are effectively recommended based on script information, the service could increase users' interest exceptionally higher compared with other video recommendation service.

If a user selects to view a recommended video (failure video or success video) shown on the device (200) display, the server (100) sends the video to the user's game device (200) so the user can watch (S230, S150). Recommended videos can be replayed with the device (200) either by downloading in the conventional streaming method or by downloading encoded video files in the server (100).

As in this invention, for games operated based on object information and script information, the following method is more effective in sending a recommended video from the server (100) to the device (200).

That is, if a user selects to view a recommended video (failure video or success video) shown on the device (200) display, the server (100) sends the video's script information solely to the device (200) (phase (f); S150). Script information, compared with other normal video files collecting image frames, has extremely smaller data capacity to transmit video information quickly.

The device (200) relates the script information sent from the server (100) with the object information already stored in the device (200) and encodes it to replay (phase (g); S240). The use of object information previously stored in the device (200) helps replay a recommended video (failure video or success video) optimally in line with the device (200)'s hardware options or display screen sizes. The resolution of each object included in object information, in particular, is adjusted to the device (200) in rendering the video, raising viewers' satisfaction with video quality. Previously, video files with several different resolution levels were stored in the server in advance for users to choose then the selected video was streaming transmitted. But, the invention uses only script information while users render a video appropriately for their device (200). Therefore, it realizes faster transmission speed and renders videos at the optimal resolution level to different devices (200).

On the other hand, under the invention, users receive recommendations on failure videos and success videos as above and play it with their device (200). By doing so, they can understand own problems and easily learn from others' successes. Therefore, compared to other normal video provision or recommendation services, this present service could increase users' interest exceptionally higher.

In addition, based the script information inquiry, the server (100) easily identifies videos of longer game play in terms of time or farther game play in terms of space among the pre-stored video list than those of the base failure situation. Thus, it becomes possible that the server (100) selects only success videos in the list. Users are expected to view more recommended videos especially when these are all success videos on what they have failed instead of randomly recommended videos. In such a manner, the server (100) can not only recommend videos but also provide game strategy guidelines. And if diverse strategy guidelines are to be provided through the game video recommendation service under this invention, user interest in the corresponding game would effectively increase to result in advertisement effect and sales effect.

This method of providing game video recommendation services, by adding advertisement to videos recommended by the server (100), can be utilized as a means of advertisement.

As mentioned above, the videos used herein comprise object information and script information thus, they are easily edited. It is also possible to add diverse forms of object to the pre-stored videos such as ad tower, banner, electronic sign board, ad balloon, etc. or lay an ad image as texture on the surface of object included in object information. As for the example implementation case herein shown in Plan 2, after forming a video list in the phase (a), the phase is to follow where the server (100) adds an object (ad object) displaying advertisement in the script information of video list or saves modified script information of the list to replace part of the previous object with the ad object (phase (h); S120). In this manner, ad can be inserted into the videos provided by the server (100) in advance.

As such, ad-inserted videos are recommended to users and users are to watch videos with ads. On the other hand, conventional video provision services allowed fixed ads in some part of the screen. The invention, however, allows ads to be inserted into each object inside a video and easily changed according to the situation not to interrupt users' video watch while still achieving excellent ad impact.

Such ad-inserted objects, however, may not be stored in a user's game device (200). So, during the phase (f) where the server (100) sends script information to the device (200), ad object data is additionally sent together (S160). The device (200) relates the received ad object with script information and replays recommended videos.

Some of the conventional video provision methods exposed ads for a certain set time before the main video and users are to click the ad skip button to watch the main video. Such a method may drop users' video watch ratio. The invented method of providing game video recommendation service herein, however, allows to add ad images in the form of object inside the videos or to replace with ad images. So, ads can be exposed throughout the video watch of users. And ad presentation herein does not much disturb users' watch, reducing their resistance against ads. While users play the game, no ad appears on the screen or disturbs their game play. Ads are effectively exposed only when users watch recommended videos thus, user resistance against ad is reduced. Depending upon the case, users may even enjoy presented ads while watching recommended videos at the same time.

Now the video saving process in the server (100) is explained. It is possible that a server (100) administrator collects videos and saves in the server. And it is also possible that a game user records own game play and uploads to the server (100) as explained hereunder by referring to Plan 3.

First, a user saves the game script information of the game he or she plays with the device (200) while playing it (phase (i); S310, S320, S330). As such, a tool that saves script information is able to install in the form of applet in games. Users can collect and save script information while game play simply by clicking the record button on the game screen. If game videos are recorded by collecting real-time play image frames, the game device (200) is excessively loaded thus, game play is cut off or image presentation is disturbed. But, as shown in the example implementation case, saving script information, the collection of simple numerical data, requires relatively smaller data capacity while not having any huge impact on game play.

As such, it is possible to directly send to the server (100) the videos recorded in the form of script information. And it is also possible for users to edit and send own videos according to their needs.

Video editing is possible in the device (200) by modifying script information. Users are to install a video edition and replay tool capable of editing script information in the device (200) (phase (i); S340). Users can change objects included in videos or replace them with another object by using such a replay and edition tool. In addition, they can also change object colors or textures.

More diverse video editing is possible if script information includes filming information that sets the location, movement and zoom distance of cameras placed in the virtual space. In editing filming information as such, more dramatic and dynamic videos can be made during a user's game play than those displayed in the device (200). For instance, if camera location is modified in editing, images are shown from a different angle than that in the initial recording for the same situation. Users can edit to move a camera along a desired route (as if a cameraman carries it and shoot) or they can change the front shooting angle to upper angle. Users can close up and expand any image they think important or adjust its replay speed to present it as a slow video. Such diverse editions are possible because the invention basically records video in the script information form.

Once video edition is completed, the device (200) receives a user's transmission order and sends the corresponding script information to the server (100) (phase (j); S350).

The server (100) stores the script information received from the device (200) and renews the video list produced in the previous (a) phase (phase (k)).

In this manner, the server (100) saves more dramatically edited videos, builds a video list and recommends to users. As a result, users' video watch is expected to rise.

The process is explained above, which users edit their game play videos in the device (200) and provide to the server (100). Depending upon cases, users can edit videos even not recorded by themselves and upload to the server back again. First, a user receives the script information of a certain video on the video list from the server (100) (phase (m)). The user edits the script information with the said replay and edition tool and uploads it back to the server (100) (phase (j)).

Advertisement can be added to the videos stored in the server (100) through a similar method to the foresaid script information modification method.

The invention has been explained with an appropriate example so far but it is not limited to the explanation and plans presented above.

For instance, it was explained before that if the server (100) recommends a failure or success video and a user selects it, the corresponding video is sent in the script information form. But, in some cases, videos can be possible transmitted in the streaming method to the device (200).

EXPLANATION OF SIGNS

100: video server 200: game device

What is claimed is:

1. A method of providing recommendations to a game user of another user's game play video, comprising:
   rendering a game play video by using object information which includes 3D shape data of characters, props and backgrounds consisting a game saving script information in a server to establish a video list, wherein the script information comprises data on appearance or disappearance time points of characters, props, and background included in the object information and movements of the characters, props, and background;

detecting a failure situation in which the game user plays the game with a game device and fails to resolve a game task, and transmitting the detected failure situation from the game device to the server;

searching a video list stored in the server to extract one or more videos including a failure video corresponding to the failure situation or a success video in a resolution process corresponding to the failure situation, wherein the server searches the failure or success video corresponding the failure situation by using the script information;

sending a recommendation message recommending the failure video or the success video searched in the server to the game device; and displaying the recommendation message on the game device.

2. The method of claim 1, further comprising:

when the game user chooses to watch the failure or success video by looking at the displayed message on the game device, sending, by the server, corresponding failure or success video script information to the game device; and connecting, by the game device, the corresponding failure or success video script information received from the server with the object information already stored in the game device to replay the failure or success video.

3. The method of claim 2, further comprising:

storing, by the server, the script information of the video list which has been modified to add an ad object displaying advertisement on video-list script information or a substitute part of existing objects with the ad object; and sending ad object data to the game device additionally so that the server connects the ad object with the script information to replay the failure or success video.

4. The method of claim 1, further comprising:

when the game user plays the game with the game device, saving the script information in the game device;

receiving user's transmission order and sending the script information saved in the game device to the server; and receiving, by the server, the script information and renewing the video list.

5. The method of claim 4, wherein the script information further comprises filming information to set up a camera location, movement, zoom level and replay speed to film objects appearing and moving according to the script information, and the method further comprises:

providing replaying and editing tools which can edit the filming information of the script information of the game device; and sending the edited script information by the user with the replaying and editing tools to the server.

6. The method of claim 4, further comprising receiving, by the game device, the script information on a specific video of the video list from the server; and sending the server the script information edited and modified by the user with replaying and editing tools, which was received by the game device.

7. The method of claim 1, wherein the script information comprises data of changes in objects' positions, angles and movements according to time.

* * * * *